United States Patent

Ahn et al.

Patent Number: 6,055,345
Date of Patent: Apr. 25, 2000

[54] MULTI-WAVELENGTH CHANNEL TRANSMISSION-TYPE OPTICAL FILTER

[75] Inventors: Joon Tae Ahn; Hak Kyu Lee; Kyong Hon Kim; El Hang Lee, all of Daejon-shi, Rep. of Korea

[73] Assignee: Electronics and Telecommunications Research Institute, Daejon-shi, Rep. of Korea

[21] Appl. No.: 09/132,432

[22] Filed: Aug. 11, 1998

[30] Foreign Application Priority Data

Aug. 12, 1997 [KR] Rep. of Korea .................... 97-38482

[51] Int. Cl.[7] ............................................. G02B 6/28
[52] U.S. Cl. ............................................. 385/24; 359/179
[58] Field of Search .................... 385/24, 37, 42; 372/6, 20, 32, 28, 38, 102, 57, 11, 19; 359/124, 130, 179, 188, 337, 341, 177, 176, 195

[56] References Cited

U.S. PATENT DOCUMENTS

| | | | |
|---|---|---|---|
| 4,905,243 | 2/1990 | Lokai et al. | 372/32 |
| 5,191,586 | 3/1993 | Huber | 372/6 |
| 5,317,660 | 5/1994 | Veith | 385/24 |
| 5,373,515 | 12/1998 | Levine | 359/19 |
| 5,471,334 | 11/1995 | Masuda et al. | 359/177 |
| 5,926,300 | 7/1999 | Mikakawa et al. | 359/124 |

OTHER PUBLICATIONS

K. Inoue et al., Tunable optical multidemultiplexer for optical FDM transmission system, Apr. 25, 1985, pp. 387–389.

HG. Toba et al., 5GHZ–spaced, Eight–channel, Guided–wave tunable multi/demultiplexer for optical FDM transmission system, Jul. 16, 1987, pp. 788–789.

*Primary Examiner*—Akm E. Ullah
*Attorney, Agent, or Firm*—Cohen, Pontani, Lieberman & Pavane

[57] ABSTRACT

The present invention provides a multi-wavelength channel transmission-type optical filter that is capable of more narrowing the bandwidth of transmission wavelength in a transmission type optical filter using Mach-Zehnder interferometer. The multi-wavelength channel transmission-type optical filter including a first optical fiber coupler for dividing a broadband light source into two lights, an optical fiber length and optical fiber length controlling unit for controlling the gap of transmission wavelength in which each receives as inputs the above lights divided by the first optical fiber coupler, a second optical fiber coupler for outputting each of the above lights, which are passed through the optical fiber length controlling unit and the optical fiber length, and an optical isolator for narrowing the width of transmission wavelength by connecting the two outputs of the second optical fiber coupler, thereby improving a wavelength selecting characteristics.

3 Claims, 1 Drawing Sheet

MULTI-WAVELENGTH CHANNEL TRANSMISSION-TYPE OPTICAL FILTER

BACKGROUND OF THE INVENTION

1. Field of the Invention

The present invention relates to a multi-wavelength channel transmission-type optical filter and more particularly, to the multi-wavelength channel transmission-type optical filter which is capable of more narrowing the width of the wavelength in an optical filter by employing Mach-Zehnder interferometer having a function of generating and dividing the multi-wavelength channel signals in an large capacity of wavelength division multiplexing optical communication.

2. Description of the Related Art

Generally, in the large capacity of wavelength division multiplexing optical communication, it is necessary to stabilize and standardize a wavelength of multi-wavelength channel and also it is important to ensure an element which is capable of dividing the multi-wavelength channel signal. In order to divide several channel signals in an optical communication through the multi-wavelength channel, a method can be implemented for using a plurality of the conventional single wavelength optical filters. However, this method is not suitable to constitute a good system because the more the number of channel to be divided becomes increased, the more the strength of light becomes weak, and also the volume of light becomes large.

There is an interferometer-type optical filter (disclosed in Electronics Letter, vol. 30, pp.642–643, 1994) for using an arrayed-waveguide grating (AWG) as an optical filter that is capable of dividing the multi-wavelength channel, simultaneously. This filter has become much developed recently, but fabrication is complex and it is not easy to control the gap of transmission wavelength (or, frequency) and the width of wavelength($\Delta\lambda$)(or $\Delta v$). Compared to it, a Mach Zehnder interferometer type optic filter has an advantage that is capable of controlling easily the transmission wavelength and that its fabrication is also very simple. However, the bandwidth of the transmission wavelengths becomes wide comparatively because the wavelength to be transmitted is transmitted sinusoidal depending on the output of the interferometer.

SUMMARY OF THE INVENTION

It is, therefore, the object of the present invention to provide multi-wavelength channel transmission-type optic filter which is capable of more narrowing the ratio of the bandwidth of transmission wavelengths to the period of transmission wavelengths, so as to improve a transmission and dividing characteristics of wavelength in a Mach Zehnder interferometer type optical filter.

To achieve the above object, the multi-wavelength channel transmission-type optical filter according to the present invention comprises: a first optical fiber coupler for dividing a light having a wide width the length of optical fiber and the controlling unit; an optical fiber length controlling unit and optical fiber length for controlling the period of transmission wavelength in which each receives as inputs the above lights divided by the first optical fiber coupler; a second optical fiber coupler for outputting each of the above lights, which are passed through the optical fiber length controlling unit and the optical fiber length; and an optical isolator for narrowing the width of transmission wavelength by connecting the two outputs of the second optical fiber coupler, thereby improving a wavelength selecting characteristics.

According to the present invention, one Mach-Zehnder interferometer and one optical isolator are provided in constituting a multi-wavelength channel transmission type optical fiber. In this structure, the bandwidth of transmission wavelengths becomes more narrow, since a light passes twice the optical fiber having the same transmission characteristics.

BRIEF DESCRIPTION OF THE DRAWINGS

For fuller understanding of the nature and object of the invention, reference should be had to the following detailed description taken in conjunction with the accompanying drawings in which.

DETAILED DESCRIPTION OF THE INVENTION

Now, detailed description of the present invention follows referring to the attached figures.

Figure 1:
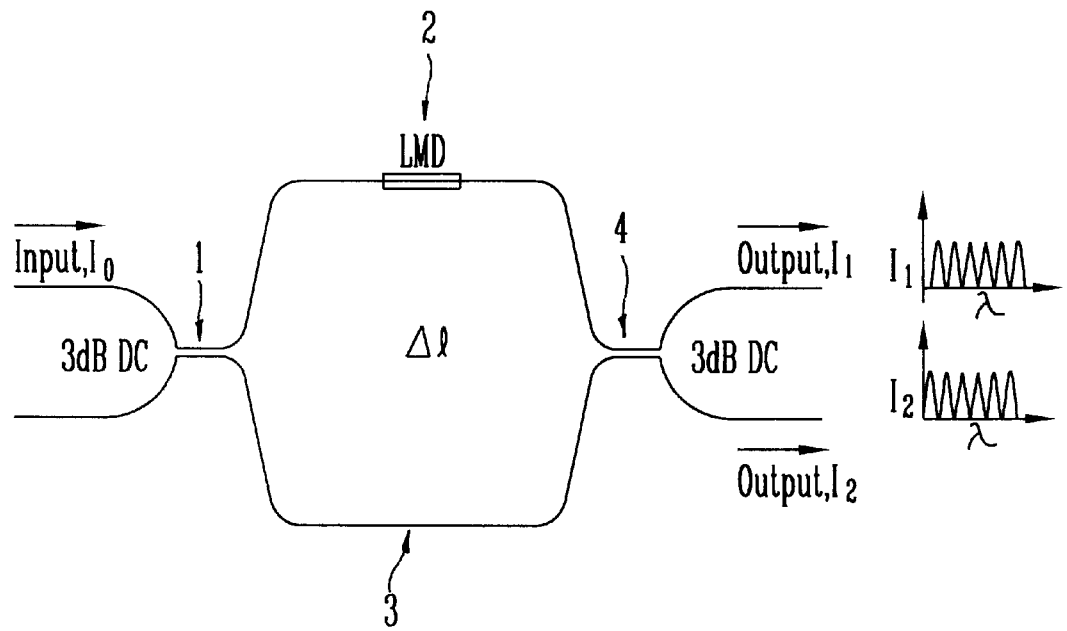
FIG. 1 is a structure showing a conventional multi-wavelength channel transmission type optical filter.

FIG. 1 shows a structure of optical filter using Mach-Zehnder interferometer presented in the prior art. A broadband optical signal, which is incident to input terminal (Input, Io), is divided into two signals in the first optical coupler 1. Then, the divided signals pass through an optical filter length controlling unit(LMD) 2 and an optical filter length 3 which constitute two arms of the Mach-Zehnder interferometer, and thereafter, meet and interfere together in the second optical coupler 4. Outputs according to the wavelength ($\lambda$) emanated from two output terminals (Output, $I_1$ and Output, $I_2$) can be expressed with the following equations:

Equation 1

$$I_1(\lambda) = I_0(\lambda)[1 - \cos(2\pi n \Delta 1/\lambda)]/2$$

Equation 2

$$I_2(\lambda) = I_0(\lambda)[1 + \cos(2\pi n \Delta 1/\lambda)]/2$$

Where, $I_0$ is a intensity of the input light, n is a refractive index of optical fiber core and $\Delta 1$ is a length difference between two arms of the interferometer. It can be seen from the above equations that there is a phase difference of 180° between the above two outputs. That is, the wavelength which has a maximum strength in $I_1$ becomes minimum in $I_2$. From the above equations, the period($\Delta\lambda$) of transmission wavelengths can be expressed as follows;

Equation 3

$$\Delta\lambda \approx \lambda^2/n\Delta 1$$

Accordingly, by controlling the length difference of the interferometer using an optical filter length controlling unit (LMD) 2, the period of transmission wavelength can be easily controlled.

Figure 2:
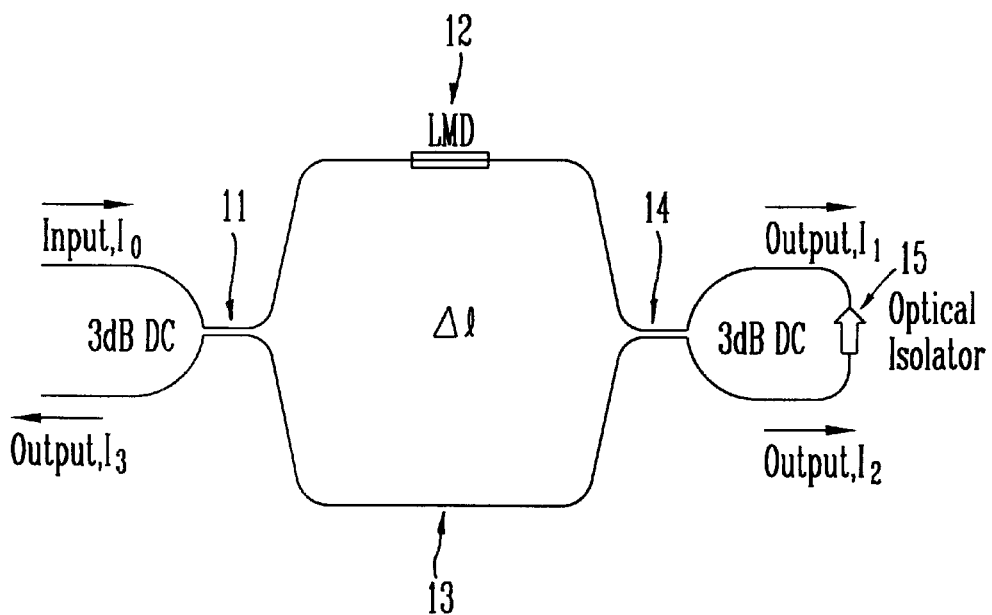
FIG. 2 is a structure showing a multi-wavelength channel transmission type optical filter according to the present invention.

FIG. 2 shows a structure of a multi-wavelength channel transmission type optical filter using Mach-zehnder interferometer which can improve the wavelength selecting characteristics by more narrowing the bandwidth of transmission wavelength. The Optical filter according to the present invention is formed by connecting together two output terminals through an optical isolator 15. Since the output($I_1$) is isolated in the optical isolator 15, output($I_2$) is only fed back to the interferometer. In this case, output $I_3$ passes twice through the interferometer and therefore it can be presented as the following equation 4, which is equal to the multiplication of the equation 2.

Equation 4

$$I_3(\lambda)=[I_0(\lambda)\{1+cos\ (2\pi n\Delta 1/\lambda)\}/2]^2$$

Comparing the equation 4 with the equation 2, the cycle of transmission wavelength of them is equal together, but the bandwidth of transmission wavelength in the equation 4 becomes narrow to 27%, compared to it of the equation 2. As a result, the structure of optical filter according to the present invention has a more improved wavelength selecting characteristics, compared to the prior art.

In case of using the interferometer as in FIG. 1 and FIG.2, it is necessary to stabilize the interferometer because the phase of light is changed easily by an influence of a circumference temperature, vibration and so on. Some methods for stabilizing the interferometer have been presented in the prior arts and therefore, the invention does not explain the structure necessary to stabilize it. The structure of the optical filter according to the invention may be realized by an optical fiber as well as embodied in the form of integration on a flat substrate made of a silica material, an organic material, a semiconductor material and so on.

As described above, a multi-wavelength channel optical filter employing Mach-zehnder interferometer, which feedbacks an output, has a characteristics that the bandwidth of transmission wavelength becomes narrow. This structure of the optical filter can be used as a element for generating and dividing multi-wavelength channel in a large capacity wavelength division multiplexing optical communication systems.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the present invention are to be encompassed as further embodiments of the present invention.

What is claimed is:

1. A multi-wavelength channel transmission-type optical filter comprising:

A first optical fiber coupler for dividing a broadband input light source into a first light signal and a second light signal;

An optical fiber length for receiving the first light signal and an optical fiber length controlling unit for receiving the second light signal for controlling the gap of transmission wavelength, said optical fiber length and said controlling unit each having a first end connected to said first optical fiber coupler;

A second optical fiber coupler connected to a second end of said fiber length and to said controlling unit for outputting said first and second light signals which are passed through the optical fiber length controlling unit and the optical fiber length, said second coupler having a pair of outputs; and An optical isolator connected to said second coupler for narrowing the bandwidth of transmission wavelength, said isolator being connected across said pair of outputs of the second optical fiber coupler, thereby improving a wavelength selecting characteristics.

2. The multi-wavelength channel transmission-type optical filter of claim 1, wherein said multi-wavelength channel transmission-type optical filter is made of any one of a silica material, an organic material and a semiconductor material.

3. The multi-wavelength channel transmission-type optical filter of claim 1, wherein said multi-wavelength channel transmission-type optical filter simultaneously generates and divides optical signals of multi-wavelength channel in an wavelength division multiplexing optical communication network.

\* \* \* \* \*